United States Patent
Seewald et al.

(10) Patent No.: US 6,233,967 B1
(45) Date of Patent: May 22, 2001

(54) REFRIGERATION CHILLER OIL RECOVERY EMPLOYING HIGH PRESSURE OIL AS EDUCTOR MOTIVE FLUID

(75) Inventors: Jeffrey S. Seewald, St. Paul, MN (US); Michael C. Boehde, Onalaska, WI (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 09/454,141

(22) Filed: Dec. 3, 1999

(51) Int. Cl.⁷ .................................................. F25B 43/02
(52) U.S. Cl. .................................................. 62/470; 62/84
(58) Field of Search .............................. 62/192, 193, 194, 62/468, 469, 470, 471, 472, 473, 84

(56) References Cited

U.S. PATENT DOCUMENTS

| | | | |
|---|---|---|---|
| 1,899,378 | 2/1933 | Zouck et al. . | |
| 1,951,915 | 3/1934 | Kagi | 62/115 |
| 2,975,613 | 3/1961 | Heidorn | 62/192 |
| 3,111,819 | 11/1963 | Williams | 62/471 |
| 4,419,865 | * 12/1983 | Szymaszek | 62/470 X |
| 4,671,081 | 6/1987 | Fujiwara et al. | 62/469 |
| 4,715,196 | 12/1987 | Sugiura | 62/468 |
| 5,461,883 | * 10/1995 | Terasaki | 62/471 X |
| 5,481,887 | 1/1996 | Terasaki | 62/471 |
| 5,606,872 | 3/1997 | Terasaki | 62/471 |
| 5,761,914 | 6/1998 | Carey et al. | 62/84 |

* cited by examiner

Primary Examiner—Harry B. Tanner
(74) Attorney, Agent, or Firm—William J. Beres; William O'Driscoll; Peter D. Ferguson

(57) ABSTRACT

A refrigeration chiller makes use of the flow of oil from an oil sump location to the chiller's compressor to power an eductor to return oil which has made its way to the evaporator of the chiller system from the evaporator to the compressor.

20 Claims, 1 Drawing Sheet

REFRIGERATION CHILLER OIL RECOVERY EMPLOYING HIGH PRESSURE OIL AS EDUCTOR MOTIVE FLUID

BACKGROUND OF THE INVENTION

The present invention relates to the return of oil from the evaporator to the compressor in a refrigeration chiller. With more particularity, the present invention relates to the return of oil from the evaporator to the compressor in a refrigeration chiller using an eductor. With still more particularity, the present invention relates to the use of an eductor to return oil from the evaporator to the compressor in a screw compressor-based refrigeration chiller where the fluid by which the eductor is powered and by which the return of oil from the evaporator is motivated is oil sourced from the chiller's oil separator, enroute to its use in the compressor.

Oil migration from the compressor in a refrigeration chiller into the chiller's refrigeration circuit occurs in virtually all compressor-driven chiller systems. The return of such oil, from the chiller's evaporator where it tends to accumulate, is an age old problem.

Many and varied techniques for returning such lubricant from the evaporator back to the compressor in a refrigeration chiller exist. Among the many oil return arrangements and apparatus used for such purposes are systems based on the use of an eductor which draws oil-rich liquid from the system evaporator and delivers it back to the system compressor. The motive force for such eductors is most typically provided by high pressure system refrigerant. Because high pressure system refrigerant is diverted from the refrigeration circuit to achieve oil return in such systems, the overall efficiency of the chiller system is penalized because such gas will have to be recompressed without having been used to cool the load which it is the purpose of the chiller to cool.

More recently, newer, lower pressure refrigerants have come to be used in refrigeration chiller systems with the result that pressure differentials within the chiller and between the condenser and evaporators are not so large as in previous systems. Such pressure differentials may be insufficient to ensure that a refrigerant-powered eductor will reliably cause the return of oil from the system evaporator to the system compressor under all system operating conditions.

Further, with the advent of use of compressors of the so-called screw type, additional uses for system lubricant, such as for sealing and cooling purposes within the compressor, have evolved which inherently cause a relatively large amount of lubricant to become entrained in the refrigerant gas stream that is discharged from the compressor. This, in turn, requires the use of an oil separator downstream of the compressor to capture such oil, prior to its being carried into the system's condenser, and to facilitate its return to the compressor.

Still further, with the advent of commercial use of evaporators of the so-called falling film type in refrigeration chillers, the importance of oil return and the complexities associated therewith have been exacerbated. The difficulties and complexity of achieving oil return in such systems is discussed in U.S. Pat. 5,761,914, assigned to the assignee of the present invention and which is incorporated herein by reference. That patent illustrates one current state of the art process and the apparatus associated with it for assuring oil return from the evaporator in a refrigeration chiller which is screw compressor-driven and which employs a falling film evaporator. As will be appreciated from a study of the '914 patent, the oil return apparatus/methodology disclosed therein, while efficient, is somewhat complicated, adds expense to the chiller and requires the use of controls and valving to accomplish oil return.

The need continues to exist for a simplified yet reliable and efficient arrangement by which to return oil from the evaporator to the compressor in a screw compressor-driven refrigeration chiller which, by its nature, does not penalize the operating efficiency of the chiller to any great extent, which will operate to return oil to the compressor under all system operating conditions and which, by its nature, is relatively simple and passive in that it does not require the use of valves or controls to achieve oil return.

SUMMARY OF THE INVENTION

It is an object of the present invention to provide apparatus and a methodology for returning oil from the evaporator to the compressor in a refrigeration chiller.

It is another object of the present invention to return oil from the evaporator to the compressor in a refrigeration chiller using an eductor.

It is a still further object of the present invention to provide apparatus and a methodology for returning oil from the evaporator to the compressor in a refrigeration chiller using an eductor powered by a motive fluid sourced from within the chiller system which is at a sufficiently high pressure to assure the return of oil from the evaporator to the compressor under essentially all chiller operating conditions.

It is a still further object of the present invention to provide for the return of oil from the evaporator to the compressor in a refrigeration chiller by use of a fluid which already circulates within the chiller for another purpose.

It is another object of the present invention to provide a passive oil return arrangement in a refrigeration chiller which obviates the need for active control of the oil recovery process and which is reliable/fail-safe from the standpoint of employing no moving parts or valves in order to obtain oil recovery.

It is still another object of the present invention to provide apparatus and a methodology for oil return from the evaporator to the compressor in a refrigeration chiller which does not generally penalize overall system efficiency in the manner or to the extent that other oil recovery systems do.

Finally, it is an object of the present invention to provide for the return of oil from the evaporator to the compressor in a screw compressor-based refrigeration chiller by the use of an eductor the motive force for which is high pressure oil sourced from the chiller's oil separator and which is employed, for the oil return purpose, in the normal course of its flow back to the system compressor.

These and other objects of the present invention, which will become apparent when the following Description of the Preferred Embodiment and attached Drawing Figures are given consideration, are accomplished by a refrigeration chiller in which the stream of compressed refrigerant gas flowing from the system compressor carries with it a significant amount of oil which is separated therefrom downstream of the compressor and prior to the delivery of the refrigerant gas to the system condenser. By virtue of the separation/disentrainment of oil from the flow stream of refrigerant gas exiting the compressor, a repository for high pressure oil is caused to exist whenever the chiller is operating. In the case of such systems, the discharge pressure that exists in the oil separation/disentrainment location is used to drive the separated/disentrained oil back to the compressor for re-use therein whenever the chiller system is in operation.

While the large majority of the oil entrained in the flow stream of gas discharged from the compressor is disentrained/separated prior to the delivery of that gas to the system condenser, a relatively very small portion of such oil fails to be separated and flows with the high pressure refrigerant gas stream into the system condenser. That oil falls to the bottom of the condenser and makes its way, together with condensed system refrigerant, to and through the system's expansion valve and into the system's evaporator. Such oil settles at the bottom of the evaporator in a liquid pool that is relatively oil-rich but which likewise contains a significant amount of liquid refrigerant. If the oil that makes its way into the evaporator is not returned therefrom for use in the compressor, the compressor will, over time, become starved for oil with potentially catastrophic results.

In order to return oil from the evaporator to the chiller's compressor, the present invention contemplates making use of the already circulating stream of high pressure oil that flows from the system's oil separator back to its compressor as the motive force by which to power an eductor. The eductor draws the oil-rich mixture from the system evaporator and returns it to the compressor for use therein, mixed together with the oil flowing back to the compressor from the system's oil separator and by which the eductor is powered.

DESCRIPTION OF THE DRAWINGS FIGURE

DESCRIPTION OF THE PREFERRED EMBODIMENT

Figure 1:
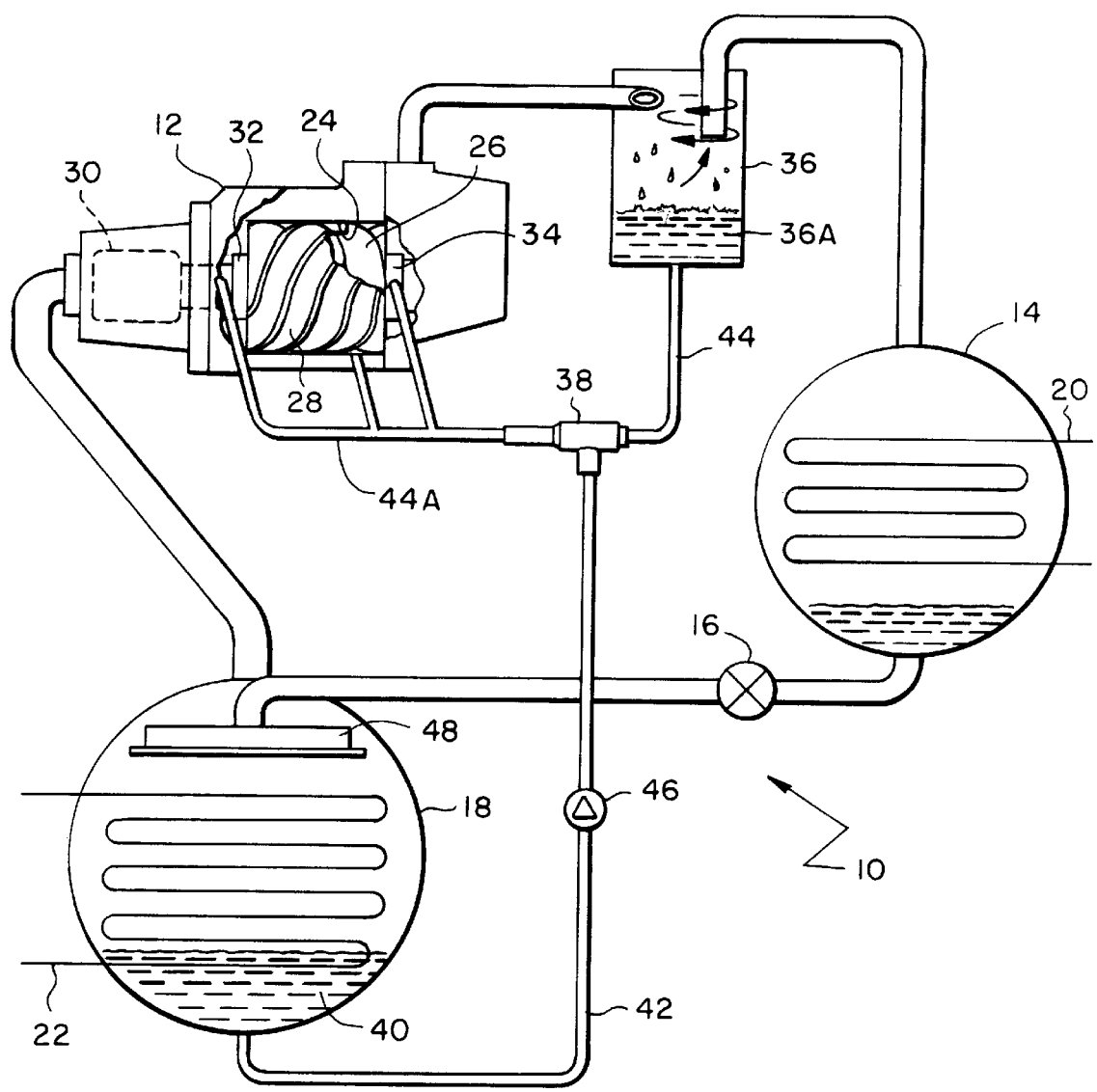
FIG. 1 is a schematic illustration of the refrigeration chiller of the present invention and the oil return apparatus/methodology which it employs.

Refrigeration chiller 10 includes a compressor 12, a condenser 14, an expansion device 16 and an evaporator 18, all of which are connected for flow to form a refrigeration circuit. In operation, compressor 12 compresses a refrigerant gas which is discharged therefrom and is delivered, at relatively high pressure and temperature, to condenser 14. There, the refrigerant gas condenses in a heat exchange relationship with a cooling medium, such as water, that flows through tube bundle 20 located in the condenser. While condenser 14 in the preferred embodiment is of the shell and tube type, it is to be understood that the use of air-cooled condensers is contemplated and falls within the scope of the invention.

Condensed refrigerant flows from condenser 14 to and through expansion device 16. In passing through expansion valve 16, the pressure of the condensed refrigerant drops, causing the vaporization of a portion thereof, and resulting in the cooling of the now two-phase refrigerant stream that flows from the expansion device. The two-phase refrigerant then flows into evaporator 18 where it is brought into heat exchange contact with a medium flowing through tube bundle 22 thereof which has been heated by the heal load which it is the purpose of chiller 10 to cool.

The medium flowing through tube bundle 22 of evaporator 18, after being cooled as a result of rejecting its heat content to system refrigerant within the evaporator, is returned to the heat load to further cool it. The heat load may, for example but not by way of limitation, be the air in a building or a fluid or gas in an industrial process.

As a result of being heated within evaporator 18, most of the liquid refrigerant delivered thereinto is vaporized. As will more thoroughly be described, however, a portion of the refrigerant delivered into evaporator 18 remains in the liquid state and pools in the bottom of the evaporator together with lubricant that has been carried out of the compressor, through the refrigeration circuit and into the evaporator. The refrigerant vapor created in or delivered into evaporator 18 is drawn thereoutof by compressor 12 for recompression and delivery to condenser 14 in an ongoing process.

Compressor 12, in the preferred embodiment of the chiller system of the present invention, is a compressor of the screw type. In that regard, compressor 12 defines a working chamber 24 in which a first screw rotor 26 and a second screw rotor 28 are disposed in a meshing relationship. One of rotors 26 and 28 is driven by motor 30. The meshing counter-rotation of the motor-driven screw rotors within working chamber 24 draws low pressure refrigerant gas from evaporator 18, compresses it and discharges it out of the compressor at an elevated, so-called discharge pressure. The efficiency and reliability of compressor 12 is predicated on the use of a lubricant, such as oil, to lubricate the bearings, such as bearings 32 and 34, in which rotors 26 and 28 are mounted for rotation and on the injection of oil into working chamber 24 to seal the rotor-to-working chamber interface.

Because a relatively large amount of oil is injected into the working chamber of compressor 12 and because the oil used to lubricate the compressor's bearings is typically delivered or vented into the refrigerant gas at a relatively low pressure location within the compressor after bearing lubrication has been achieved, a relatively large amount of oil is carried out of compressor 12 entrained in the stream of high pressure refrigerant gas that is discharged therefrom. In order to capture the oil that makes its way out of compressor 12 so as to ensure its return and continued availability for use in compressor 12, oil separator 36 is interposed in the flow path that connects compressor 12 and condenser 14.

Oil separator 36 is highly efficient and separates/disentrains the very large majority of lubricant that escapes compressor 12 entrained within the stream of discharge gas discharged therefrom, the separated oil settling in sump 36A within the oil separator. No matter how efficient oil separator 36 is in terms of separating oil from the refrigerant gas flow stream, a relatively very small amount of oil will inherently be carried through the oil separator in the refrigerant gas flow stream and will make its way therewith downstream to the system condenser.

That oil will flow with the refrigerant through the condenser, through expansion device 16 and will be delivered into evaporator 18 in liquid droplet form. Such oil droplets fall or drip to the bottom of evaporator 18 and pool there together with the portion of the liquid refrigerant delivered into the evaporator that is not immediately vaporized by the heat exchange process ongoing therein. Over time, the entirety of the system's oil supply will make its way into and accumulate in the system evaporator unless it is returned therefrom on a regular basis.

The refrigeration chiller of the present invention contemplates returning oil from evaporator 18 by the use of an eductor 38 as oil return apparatus which draws the oil-rich mixture of liquid refrigerant and oil 40 pooled in the evaporator thereoutof and returns it to compressor 12. In the case of the chiller system of the present invention, use is made of the already circulating flow stream of oil, which is at discharge pressure and which is caused to flow from sump 36a of oil separator 36 back to compressor 12 by the differential pressure that exists between the oil separator and the locations in compressor 12 to which such oil is delivered, as the motive fluid by which eductor. 38 is powered.

In that regard, eductor 38 is connected by oil return line 42 to the location in evaporator 18 where oil-rich mixture 40 will be found when chiller 10 is in operation. As will be appreciated and understood, the evaporator and the oil-rich mixture found therein are at a relatively much lower pressure than the pressure that exists in the oil separator. A check valve 46 will preferably be disposed in line 42 so that when chiller 10 shuts down or the load thereon changes, reverse flow through line 42 does not occur.

In addition to being connected to evaporator 18, eductor 38 is interposed in line 44 by which oil is supplied from sump 36a of oil separator 36, which is the primary source of lubricant for compressor 12 when it is in operation, to compressor 12. The high pressure oil flowing through the eductor enroute from the oil separator to the locations of its use in the compressor creates a vacuum in the eductor which draws oil-rich fluid 40 from the evaporator and delivers it into the stream of oil flowing to various compressor locations through portion 44A of oil supply line 44.

It is to be noted that the pressure in the oil separator and of the flow stream of oil that is driven therefrom back to compressor 12 in the present invention will essentially be the same as the pressure of the discharge gas that issues from the compressor. This is for the reason that the oil separator is located immediately downstream of the compressor and the flow stream that issues therefrom is not generally subjected to significant pressure drop prior to its entry into the oil separator. Therefore, the pressure at the compressor discharge location and in the oil separator will generally be found to be as high or higher than any other location in the chiller while the chiller is in operation.

On the other hand, the pressure in condenser 14, while high and while generally "discharge pressure", will typically be somewhat lower than the pressure found at the compressor discharge location and in the oil separator for the reason that some pressure drop will have occurred in the stream of refrigerant gas as it travels from the oil separator, to and into the system condenser and because condenser pressure will vary and can, in fact, become relatively low under certain chiller operating conditions. As such, oil separator 36 is a more reliable, consistent and typically higher pressure location from which to source a motive fluid for an eductor than will be condenser 14. The availability of a reliably high pressure location in a chiller from which to draw a fluid other than system refrigerant to power an oil-return eductor, in the normal course of the motive fluid's flow within the chiller and where such flow is to the location of use of the oil being returned from the evaporator, is new, unique and advantageous.

It is to be noted that in the preferred embodiment of the present invention evaporator 18 will be of the so-called falling film type. In evaporators of the falling film type refrigerant is delivered in droplet form from a refrigerant distributor, such as distributor 48 onto the evaporator's tube bundle essentially across the length and width thereof. This results in the occurrence of a highly efficient vaporization process within the evaporator as compared to the process that occurs in other types of evaporators, such as evaporators of the flooded type, wherein a large portion of the tube bundle is immersed in a liquid refrigerant pool. The use of a falling film evaporator reduces the size of the refrigerant charge needed by a chiller system and also results in the creation of a relatively oil-rich and generally homogenous pool of liquid at the bottom thereof. The efficiency and reliability of the oil return process in screw compressor based chiller systems, particularly those in which a falling film evaporator is employed, is therefore particularly critical. It should be understood, however, that the present invention is also contemplated for use in systems employing evaporators of other than the falling film type.

Figure 2:
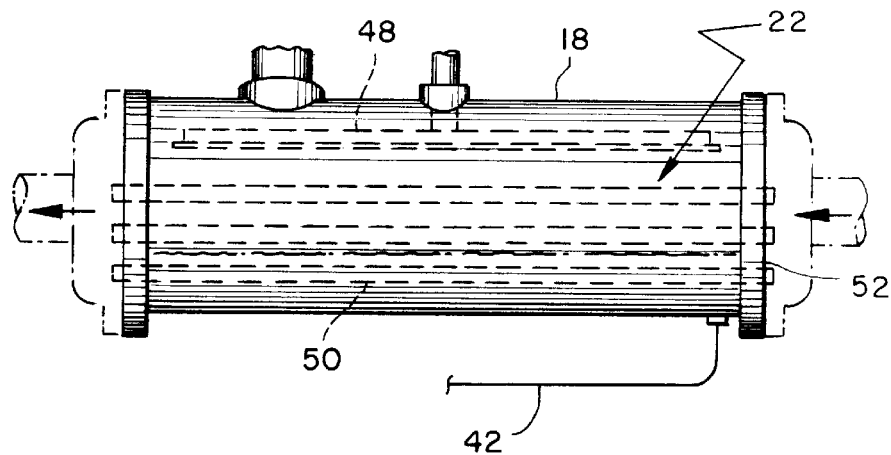
FIG. 2 is a schematic side view of the evaporator of the chiller of FIG. 1.

Referring additionally now to FIG. 2, it is further to be noted that the choice of location from which the oil-refrigerant mixture is drawn out of the evaporator can, in fact, enhance the heat transfer efficiency of the system evaporator, particularly an evaporator of the falling film type. In that regard, at least some of the tubes, such as tube 50, in tube bundle 22 of evaporator 18 will be immersed in the oil-rich mixture found at the bottom of the evaporator shell. While relatively oil-rich, the majority of this mixture will be liquid refrigerant.

It has been found that the efficiency of the heat exchange process that occurs within the evaporator is enhanced if the location where the oil-rich mixture is drawn out of the evaporator for return to the system compressor is near the location where the medium flowing through the evaporator tube bundle enters the evaporator shell. Such medium will be at its hottest at the location where it enters the evaporator shell.

By drawing the oil-rich mixture from the evaporator at a location where the medium flowing through the tubes immersed therein is warmest, counterflow is set up between the oil-rich mixture being drawn out of the evaporator and the medium flowing through such tubes. Further, it has been found that the concentration of oil within the oil-rich pool in the evaporator will tend to be lower almost immediately downstream of the location from which the oil-rich mixture is drawn out of the evaporator shell. As a result, heat transfer performance of the evaporator is enhanced because the oil concentration is high in the general location where the medium first enters the evaporator and becomes lower quite quickly and for the remainder of the flow of the medium through the immersed evaporator tubes. The lesser oil concentration over the course of the medium's flow through such tubes permits more efficient heat transfer to occur and enhances overall evaporator efficiency. As such, line 42 by which oil is returned to the system compressor will preferably open into evaporator 18 at the end 52 of the evaporator where the cooling medium flowing through the tubes immersed in the oil-rich mixture enters the evaporator shell.

As will be appreciated, oil return in the chiller system of the present invention is accomplished by a relatively simple process and by relatively simple apparatus and, more significantly, by the use of a reliably high pressure fluid in the normal course of that fluid's circulation within the chiller system. Further, the system of the present invention is passive, in that it need not be controlled does not rely on valve positioning or any other moving parts to function, and will operate to return oil from the evaporator whenever the chiller system is in operation. Compressor and chiller reliability is therefore enhanced. Still further, the oil return system and methodology of the present invention does not generally cause the overall efficiency of the chiller system to be penalized as a result of the oil return process to the extent that such penalties occur in other chiller oil return systems, particularly those which employ system refrigerant in the oil return process.

While the present invention has been described in terms of a preferred embodiment, it will be appreciated that modifications and variations thereto are contemplated and fall within its scope.

What is claimed is:

1. A refrigeration chiller comprising:
   a condenser;
   an expansion device;
   an evaporator;
   a compressor, said condenser, said expansion device, said evaporator and said compressor being connected for flow to form a refrigeration circuit;
   a source location from which oil is supplied to said compressor when said chiller is in operation, a portion of said oil making its way to said evaporator after being supplied to said compressor; and
   oil return apparatus, said oil return apparatus being connected for flow to said source location, to said compressor and to said evaporator so that the flow of oil being supplied to said compressor from said source location causes oil to be returned to said compressor from said evaporator.

2. The refrigeration chiller according to claim 1 wherein said oil return apparatus is an eductor.

3. The refrigeration chiller according to claim 2 wherein pressure within said source location drives oil therefrom to said compressor when said chiller is in operation.

4. The refrigeration chiller according to claim 3 wherein oil supplied to said compressor flows from said compressor entrained within the compressed refrigerant gas stream that is discharged by said compressor and further comprising an oil separator, said oil separator receiving said gas stream from said compressor and acting to disentrain a majority of the oil entrained within said refrigerant gas stream, said oil separator being said source location for oil supplied to said compressor.

5. The refrigeration chiller according to claim 4 wherein said oil separator is in flow communication with said compressor via an oil supply line, wherein said eductor is disposed in said oil supply line and wherein said eductor is in flow communication with said evaporator via an oil return line.

6. The refrigeration chiller according to claim 5 wherein said evaporator has a tube bundle through which a heat transfer medium flows, wherein oil making its way into said evaporator settles to the bottom thereof and there mixes with liquid refrigerant to form an oil-rich mixture of oil and liquid refrigerant, wherein said eductor draws oil out of said evaporator for return to said compressor in the form of said oil-rich mixture and wherein at least one tube of the tube bundle of said evaporator is immersed in said oil-rich mixture.

7. The refrigeration chiller according to claim 6 wherein the location at which said oil-rich mixture is drawn out of said evaporator for return to said compressor through said oil return line is generally proximate the location where the heat transfer medium flowing through said at least one immersed evaporator tube enters said tube so that the flow of said oil-rich mixture as it is drawn out of said evaporator is counter to the direction of flow of said heat transfer medium through said at least one tube.

8. The refrigeration chiller according to claim 5 further comprising a check valve, said check valve being disposed in said oil return line.

9. The refrigeration chiller according to claim 1 wherein the flow of oil from said source location to said compressor is through an oil supply line and is as a result of the pressure differential existing between said source location and said compressor.

10. The refrigeration chiller according to claim 9 wherein said oil return apparatus is an eductor connected to said evaporator by an oil return line.

11. The refrigeration chiller according to claim 10 wherein said oil flowing through said oil supply line from said source location flows through said eductor, wherein said source location is an oil separator disposed intermediate said compressor and said condenser in said refrigeration circuit, and wherein the return of oil from said evaporator to said compressor is in the absence of any controls dedicated to the oil return function.

12. The refrigeration chiller according to claim 11 wherein said evaporator has a tube bundle through which a heat transfer medium flows, wherein oil which makes its way into said evaporator during the course of chiller operation settles to the bottom thereof and there mixes with liquid refrigerant to form an oil-rich mixture of oil and liquid refrigerant and wherein at least one tube of said tube bundle is immersed in said oil-rich mixture, said oil-rich mixture being drawn out of said evaporator by said eductor for return to said compressor.

13. A refrigeration chiller comprising:
   a condenser;
   an expansion device;
   an evaporator;
   a screw compressor, said compressor defining a working chamber in which a first and a second screw rotor are disposed, said condenser, said expansion device, said evaporator and said compressor being connected for flow to form a refrigeration circuit, oil being supplied to said compressor when said compressor is in operation, said oil becoming entrained in the flow stream of refrigerant gas that is compressed in and discharged from said compressor;
   an oil separator, said oil separator receiving said stream of refrigerant gas that is discharged from said compressor and in which oil is entrained, said oil separator acting to disentrain the majority of oil entrained in said refrigerant gas stream, said disentrained oil being supplied back to said compressor from said oil separator when said compressor is in operation and at least some of the oil which said oil separator fails to disentrain from said refrigerant gas stream flowing to said evaporator; and
   an eductor through which oil being supplied from said oil separator to said compressor flows, said eductor being connected for flow to said evaporator so that the flow of oil from said oil separator to said compressor through said eductor draws oil from said evaporator and delivers it back to said compressor when said compressor is in operation.

14. The refrigeration chiller according to claim 13 wherein the pressure in said oil separator is greater than the pressure at the locations in said compressor to which oil is supplied, the differential pressure between said compressor locations and said oil separator causing oil to flow from said oil separator to said locations.

15. The refrigeration chiller according to claim 14 wherein the oil that makes its way to said evaporator settles at the bottom thereof and there mixes with liquid refrigerant to form an oil-rich mixture of oil and liquid refrigerant and wherein said evaporator has a tube bundle through which a heat transfer medium flows, at least one of the tubes of the tube bundle of said evaporator being immersed in said oil-rich mixture, said eductor drawing said oil-rich mixture from said evaporator.

16. The refrigeration chiller according to claim 15 wherein said eductor draws said oil-rich mixture from said evaporator at a location where the heat transfer medium flowing through said tube is at its warmest so as to set up the counterflow of said oil-rich mixture as it is drawn out of said evaporator with respect to the direction of flow of said heat transfer medium through said at least one tube.

17. A method of returning oil from the evaporator to the compressor of a refrigeration chiller comprising the steps of:

discharging a stream of compressed refrigerant gas in which oil is entrained from said compressor when said chiller is in operation;

disentraining a majority of the oil entrained in said stream;

collecting oil disentrained in said disentraining step at a source location;

flowing the stream of refrigerant gas from which the majority of oil has been disentrained in said disentraining step to the evaporator of said chiller where at least a portion of the theretofore undisentrained oil settles, together with liquid refrigerant, to form an oil-rich mixture of oil and liquid refrigerant at the bottom of said evaporator;

flowing oil from said source location to said compressor; and using oil flowing in said oil flowing step as the motive force by which to draw said oil-rich mixture from said evaporator for delivery to said compressor.

18. The method acccording to claim 17 comprising the further step of employing the pressure which exists at said source location to cause the flow of oil from said source location to said compressor in said oil flowing step.

19. The method according to claim 18 comprising the further steps of defining a flow path in said chiller between said source location and said compressor through which oil flows in said oil flowing step; disposing an eductor in said flow path so that oil flowing in said oil flowing step flows therethrough; and, connecting said evaporator to said eductor so that the effect of oil flowing through said eductor enroute from said source location to said compressor is to draw said oil-rich mixture from said evaporator and return it to said compressor.

20. The method according to claim 19 comprising the further step of preventing the flow of oil through said eductor to said evaporator.

* * * * *